Nov. 22, 1938.  F. L. MEISSNER  2,137,620
CREAM REMOVING DEVICE
Filed June 14, 1938
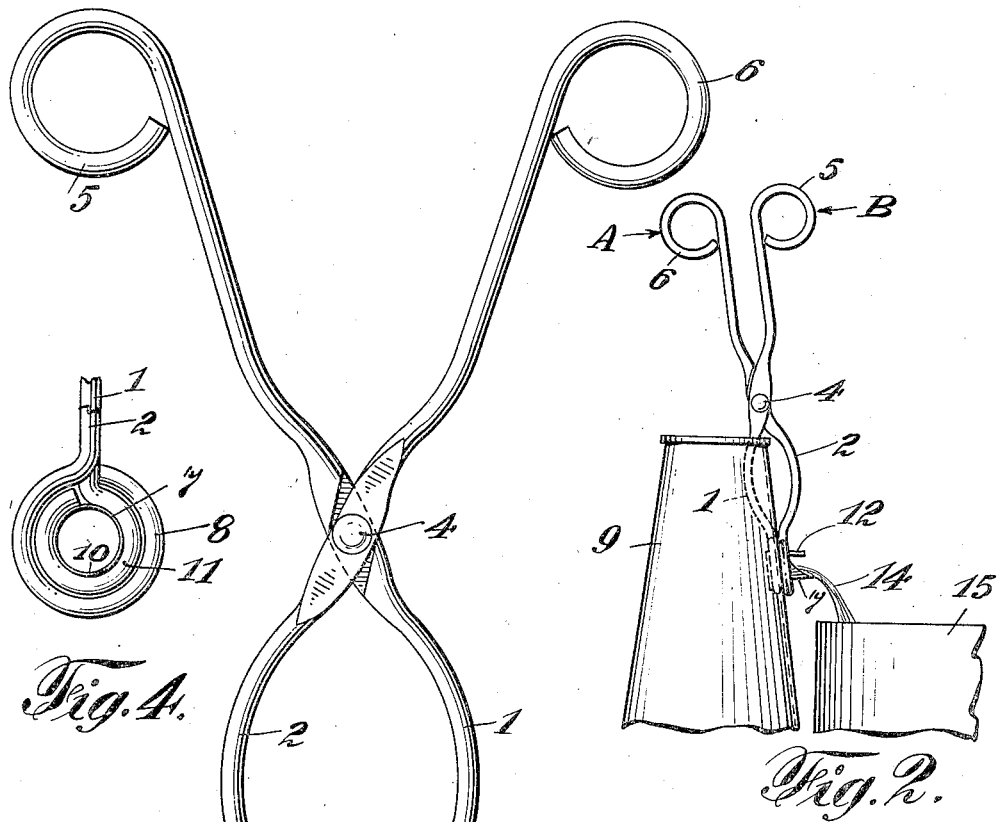
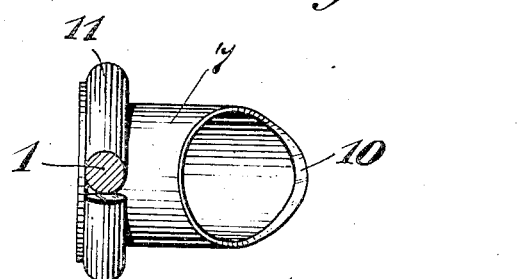
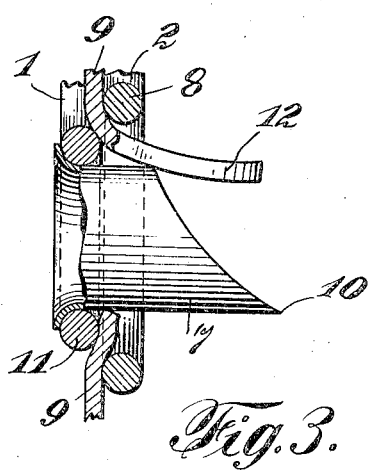
INVENTOR
Frances L. Meissner
BY
her ATTORNEYS Patented Nov. 22, 1938

2,137,620

UNITED STATES PATENT OFFICE 2,137,620

CREAM REMOVING DEVICE

Frances L. Meissner, Brooklyn, N. Y.

Application June 14, 1938, Serial No. 213,651

7 Claims. (Cl. 221—23)

The present invention is embodied in a device for removing cream from sheet material packages.

The present invention in its preferred form comprises a tong-like member with the nose of the tong terminating in a pair of cooperating members, one of which is a cutter in the form of a spout and the other of which is a ring abutment through which the cutter spout is effective.

The device is intended for use primarily with a milk package in common commercial use comprising a conical paper side wall fitted with suitable ends to form a milk bottle. When such a package is permitted to stand for a few hours, the cream rises to the top, but it is difficult to remove this cream by pouring. One of the difficulties preventing removal by pouring is a ledge, usually of tin, formed at the mouth of the container to receive a suitable closure. In the use of the present invention, the operator introduces the spout knife arm of the tongs into the mouth of the paper milk bottle and submerges the same into the cream to the depth to which the operator judges the cream level extends. Then by applying pressure to close the tongs in a shear-like movement, the ring abutment nose of the tongs applies pressure to the outside wall of the container so that the point of the spout knife cuts through the side wall of the package or paper milk bottle. The spout knife is so constructed as to leave a connecting tab at the upper end of the circular disc-like portion which is partially cut away from the side wall of the package. The spout knife is preferably so constructed as to push the partially severed tab above the spout so that the cream may drain through the spout knife to a suitable container placed at the side of the milk bottle wtihout the tab interfering with the flow and in the majority of cases, it is not necessary to tip the milk bottle or package in order to draw off the full layer of cream (assuming that the operator has correctly judged the depth of the cream). When the cream is drawn off, the device is removed from the milk bottle and the tab may be pressed back into place so that the opening is closed sufficiently to retain the remaining contents of the milk bottle from air and dust contamination.

While the device has been referred to in connection with cream removal, it may also be used to puncture side walls of tin cans or other thin walled containers having severable walls and from which it is desired to withdraw a layer of the contents.

Other and further objects of this invention will in part be obvious and will in part be pointed out hereinafter and wherein like characters are used to represent like parts throughout the several figures of the drawing comprising a part of this specification.

Fig. 1 illustrates the device with the arms open.

Fig. 2 shows the device in operation after the side wall of a container has been punctured.

Fig. 3 is a detail view, partly in section, illustrating the operation of puncturing the side wall of a paper milk bottle.

Fig. 4 is a front view of the nose of the tongs.

Fig. 5 is a top view of the cutter spout.

Referring now to the drawing, the device comprises a pair of arms 1 and 2 which are pivoted by means of a rivet 4 or other suitable fastening member and may be, where desired, provided with thumb and finger rings 5 and 6. The arm 1 at its forward end carries a cutter spout 7 which is securely attached to the arm 1. The arm 2 is provided on its outer end with an abutment member 8, preferably in the form of a ring, which preferably has its interior diameter larger than the exterior diameter of the cutter spout 7. When the device is introduced into a paper milk bottle 9 and pressure applied to the thumb rings in the direction of the arrows A and B, the point 10 on the cutter spout 7 severs the side wall of the paper milk bottle 9 and as pressure is continued, the cutter spout 7 is forced through the abutment ring 8 until the supporting ring 11 for the cutter spout 7 reaches the inner side wall of the paper milk bottle and the paper side wall is clamped between the supporting ring 11 and the abutment ring 8. When this happens, a disc-like tab 12 has been partially cut from the side wall of the paper milk bottle and is pushed upwardly, although preferably still attached to the paper side wall of milk bottle 9 and the pressure of the abutment ring 8 on the paper side wall forces this side wall tightly against the supporting ring 11 to cause this supporting ring 11 to act as a gasket seal and thus prevents leakage of the cream around the outside of the spout 7. The cream flows through the spout 7 in a stream 14 which may fall into a suitable container 15 positioned to receive the flow of cream. After the flow ceases, the device is removed from the side wall of the milk bottle and the tab 12 may be gently forced back into place in the side wall of the milk bottle to close the opening and thus the operation is completed.

The device is constructed in such manner as to be easily cleaned and sterilized so as to avoid any contamination of the cream during its operation.

What I claim is:

1. In a device of the class described, a pair of arms pivoted together to form a tong-like member, the outer end of one of said arms being provided with a cutter spout, the other of said arms being provided with an abutment member through which said cutter spout extends when said tongs are closed, said cutter spout arm being adapted to be extended into a container and said abutment arm being adapted to contact the outer wall of the container whereby the side wall of the container is partially severed when said tongs are forceably closed to permit the contents of the container adjacent said cutter spout to flow through said cutter spout.

2. In a device of the class described, a pair of arms pivoted together to comprise a tong-like member, the outer end of one of said arms being provided with a substantially cylindrical cutter spout having an inclined cutting edge adapted for progressive cutting, the other of said arms being provided with a ring-like abutment member through which the cutter spout extends when the tongs are closed, a ring-like supporting member surrounding said cutter spout whereby when said tongs are inserted over the side wall of the container and forceably closed the cutter partially severs a portion of the side wall of the container and the ring-like members clamp the side wall of the container to cause the supporting ring member to act as a seal to prevent leakage of liquid around the outside of the spout so that the liquid in the container flows through said spout only when the side wall of the container has been partially severed.

3. A device of the class described comprising a pair of members secured together for relative movement, one of said members having a hollow cutter extending toward the other member, the said other member being formed to provide an aperture to receive said cutter, said aperture conforming substantially to the cross-sectional shape of said cutter and being larger than said cutter, said cutter having at least part of its forward edge sharpened to penetrate the wall of a container.

4. A device of the class described comprising a pair of members secured together for relative movement, one of said members having a hollow cutter extending toward the other member, the other member being formed to provide an aperture through which the cutter is adapted to extend, said aperture conforming substantially to the cross-sectional shape of said cutter and being larger than said cutter, said cutter having its forward edge tapered to progressively penetrate the wall of a container.

5. A device of the class described comprising a pair of members secured together for relative movement, one of said members having a hollow cutter extending therefrom toward the other of said members, said cutter being movable to penetrate the wall of a container and at least partially sever a portion therefrom, said cutter forming a dispensing spout when extending through the wall of said container.

6. A device of the class described comprising a pair of members secured together for relative movement, one of said members having a hollow cutter extending toward the other member, the said other member being formed to provide an aperture to receive said cutter, said aperture conforming substantially to the cross-sectional shape of said cutter and being larger than said cutter.

7. A device of the class described comprising a pair of members secured together for relative movement, one of said members having a hollow cutter extending toward the other member, the said other member being formed to provide an aperture to receive said cutter, said aperture conforming substantially to the cross-sectional shape of said cutter and being larger than said cutter, said other member being adapted to rest against and support the wall of a container during penetration of said cutter therethrough.

FRANCES L. MEISSNER.